Nov. 9, 1926.
H. COLE
TIRE CHAIN CONNECTER
Filed Nov. 23, 1925
1,606,148
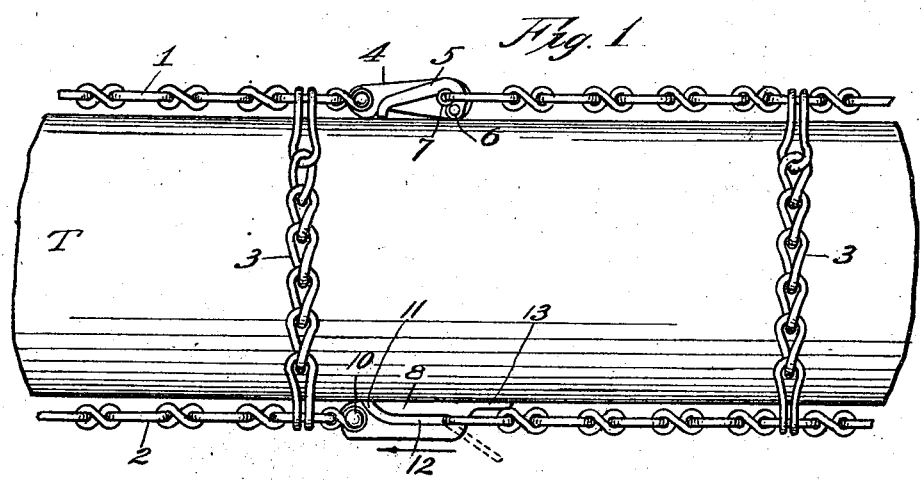
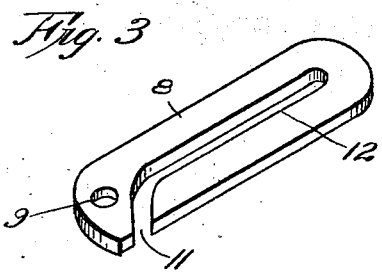
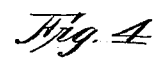
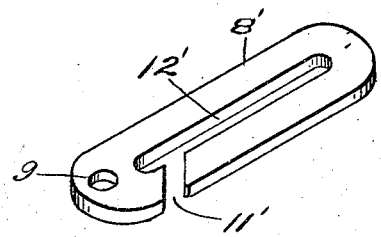
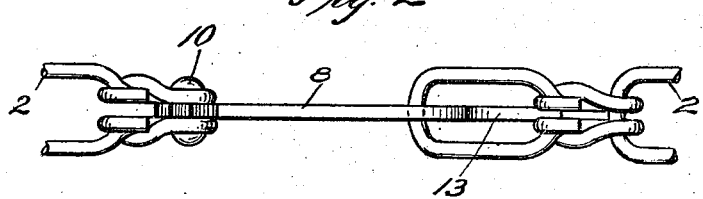
Inventor,
Horace Cole.

Patented Nov. 9, 1926.

1,606,148

UNITED STATES PATENT OFFICE.

HORACE COLE, OF REA, MISSOURI.

TIRE-CHAIN CONNECTER.

Application filed November 23, 1925. Serial No. 70,818.

This invention relates to tire chain connecters, and more especially to connecters for the inner circumferential or ring member of a tire chain.

It is common knowledge that the application and removal of tire chains from a wheel of a motor car or the like is attended with more or less difficulty and trouble under the most favorable circumstances, and that this difficulty and trouble is greatly increased in very cold or other inclement weather, and that it is exceedingly difficult and troublesome to apply or remove the chains when the car is either standing on a muddy road, or after mud collected upon the chains, has hardened or caked in position upon the chains and fastening elements thereof, the difficulty being greater with respect to the circumferential member of the chain at the inner side of the wheel than at the outer side because the inner member is more difficult of access.

It has been found by repeated experiments or tests that if the outer circumferential member of a tire chain is properly tensioned and so secured by its fastening element, that the transverse or cross chains or links connecting the outer and inner circumferential members, bind sufficiently on the periphery of the tire to render unnecessary an equivalent tightening or tensioning of the inner member of the chain. I have therefore made provision for a connection for the ends of the inner member of the chain, providing sufficient play to render it easy to connect or disconnect such ends under all conditions except perhaps, where ice has formed or mud has frozen on the connecter, and my object is to produce a device or connecter of the character mentioned which is of simple, strong, durable and cheap construction, and which can be easily applied to a chain at the time the same is manufactured, or as a replacement for the fastener or connecter with which the inner member of the chain is originally equipped, and in order that the invention may be fully understood, reference is to be had to the accompanying drawing in which:—

Figure 1 is a fragmental plan view of a tire chain in which the inner member is equipped with a connecter embodying the invention.

Figure 2 is an enlarged side elevation of the connecter and the adjacent ends of the chain.

Figure 3 is a detail perspective view of the connecter with a guard finger omitted.

Figure 4 is a detail perspective view of a modified form of the connecter also omitting the guard finger.

Referring to the drawing in detail, 1 indicates the outer circumferential member, 2 the inner circumferential member and 3 cross chains or links between said members and adapted, as customary, for extending transversely over a tire fitting between the circumferential members 1 and 2. One end of the circumferential member 1 may be equipped with any suitable fastener or connecter, that shown comprising a body 4 pivoted at one end to the chain, and a hook-shaped lever 5 pivoted at 6 to the body 4 near the free end thereof, and adapted to be fitted through one of the links of the other end of the chain and then operated pivotally to tighten the chain and draw said link into a notch 7 of the body portion 4, the free end of the lever interlocking with the body portion to prevent accidental reverse movement of the former. In this connection it will be understood that the fastener or connecter described is merely one type now in common use and that any other type performing the same function may be substituted for it without affecting the present invention, which, in its broadest aspect, comprises what may be termed an elongated hook 8 having an eye 9 for the reception of the pivot 10, permanently connected to one end of the chain member 2, and engaging a link at or near the other end of said member. In Figure 4, the hook is shown as a modified construction, in that the mouth 11' of the hook is disposed at an intermediate point in the length of the slot 12' of the hook, as distinguished from the preferred type (see Figure 3), where the mouth of the hook is at one extremity of the slot. It is possible that the type of hook shown by Figure 4 may possess some advantages over that shown by Figure 3, under some conditions of service, but no such conditions developed during the experiments or tests referred to, as in no instance, in driving a car equipped with a chain having a connecter of the type shown in Figure 3, over muddy roads, did the connecter fail to maintain its operative relation with respect to the ends of the inner member, and it was also found under such tests that no difficulty or trouble was encountered in effecting quick disengagement of the connecter 8 from the releasable end of the chain, when desired.

As hereinbefore suggested, when the outer circumferential member is properly tensioned and secured, and the ends of the inner member have been linked together by the connecter, the pull of the outer member on the cross links 3 bind the latter with sufficient friction upon the tire to make it impossible for the connecter 8 to become detached from the releasable end of the inner circumferential member. After the fastening means for the ends of the outer member has been operated to effect disconnection between the ends of the outer member, it is possible to readily gather sufficient slack in the inner member to permit the releasable link thereof to be slipped out of the slot of the hook 8, it being likewise obvious that said link can be as easily engaged with said hook provided the connection is made before the ends of the outer member are secured together to effect the tightening or tensioning of the outer member.

By reference to Figure 1, it will be seen that the connecter 8 is shown as provided with an extension or guard finger 13 in line with the mouth of the hook, that is occupying a vertical plane inward of the engaged or inner chain member 2. By this arrangement, the mouth of the hook is adjacent and substantially closed by the tire T, and the extension or guard finger is of such proportion that it cannot swing outward through the engaged link. It is possible to disengage the connecter 8 only by swinging the engaged chain link outward as indicated by dotted lines, Figure 1, and then sliding it as indicated by the adjacent arrow, to the mouth of the hook. This cannot be done unless there is sufficient slack in the inner circumferential member, and even if this slack existed after the outer circumferential chain member was tensioned and secured, the tire adjacent the mouth of the hook 8 would prevent accidental disengagement of the releasable link from the hook.

It will thus be seen that while the extension or guard finger is not believed to be indispensable, it is desirable as providing for additional security against loss of a tire chain in the event the outer circumferential member thereof became unfastened.

From the above description, it will be apparent that I have produced a connecter by which the ends of the inner member of a tire chain can be easily and quickly secured together or released, and it will be apparent that the special connecter may be slightly modified in other respects than as shown by Figure 4, without departing from the principle and scope of the appended claims.

I claim:

1. The combination in a tire chain, of means for connecting the ends of the outer circumferential member of the chain in tensioned relation, with a hook-shaped connecter fastened at one end to one end of the inner circumferential member of the chain and extending through a link of the other end of the said inner member, the hook extending longitudinally with respect to the said inner member, with the mouth of its slot remote from the releasable end of the said member and at an angle thereto.

2. The combination in a tire chain, of means for connecting the ends of the outer circumferential member of the chain in tensioned relation, with a hook-shaped connecter fastened at one end to one end of the inner circumferential member of the chain and extending through a link of the other end of the said inner member, the hook extending longitudinally with respect to the said inner member, with the mouth of its slot remote from the releasable end of the said member and opening toward the outer circumferential member, and provided at the opposite end from said mouth with an extension finger incapable of swinging laterally through the releasable chain link engaged by the hook.

3. A connecter for the end of the inner circumferential member of a tire chain, the connecter being in the form of a long flat metal hook provided with an eye or opening in line with the longitudinal center of the hook and adjacent the mouth of the latter, and also provided at the opposite end from said mouth and in line with the latter, with an extension or guard finger.

In witness whereof I hereunto affix my signature.

HORACE COLE.